(12) United States Patent
Ueda

(10) Patent No.: US 11,325,483 B2
(45) Date of Patent: May 10, 2022

(54) PLATE AND PLATE SYSTEM

(71) Applicant: IHI Corporation, Tokyo (JP)

(72) Inventor: Akio Ueda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 201 days.

(21) Appl. No.: 16/753,893

(22) PCT Filed: Oct. 9, 2018

(86) PCT No.: PCT/JP2018/037568
§ 371 (c)(1),
(2) Date: Apr. 6, 2020

(87) PCT Pub. No.: WO2019/073961
PCT Pub. Date: Apr. 18, 2019

(65) Prior Publication Data
US 2020/0254889 A1 Aug. 13, 2020

(30) Foreign Application Priority Data

Oct. 10, 2017 (JP) .............................. JP2017-196955

(51) Int. Cl.
*B60L 53/12* (2019.01)
*F16M 13/00* (2006.01)
*B60L 53/30* (2019.01)
*H02J 50/10* (2016.01)
*H02J 50/90* (2016.01)

(52) U.S. Cl.
CPC ............ *B60L 53/12* (2019.02); *F16M 13/00* (2013.01); *B60L 53/30* (2019.02); *F16M 2200/08* (2013.01); *H02J 50/10* (2016.02); *H02J 50/90* (2016.02)

(58) Field of Classification Search
CPC ......... B60L 53/12; B60L 53/30; F16M 13/00; F16M 2200/08; H02J 50/10; H02J 50/12; H02J 50/90; H02J 7/00; H02J 50/005; Y02T 90/00; Y02T 90/12; Y02T 90/14; Y02T 10/7072
See application file for complete search history.

(56) References Cited

U.S. PATENT DOCUMENTS

| | | | | |
|---|---|---|---|---|
| 5,265,386 A | * | 11/1993 | Muhlethaler | ......... E04F 15/024 |
| | | | | 52/126.6 |
| 5,821,731 A | * | 10/1998 | Kuki | ....................... B60L 53/31 |
| | | | | 320/108 |
| 2002/0078638 A1 | * | 6/2002 | Huang | ...................... E04B 5/43 |
| | | | | 52/126.6 |
| 2011/0133692 A1 | | 6/2011 | Shimoyama | |

FOREIGN PATENT DOCUMENTS

| | | |
|---|---|---|
| JP | 52-030171 Y2 | 7/1977 |
| JP | 62-146836 U1 | 9/1987 |
| JP | 63-023429 U | 2/1988 |

(Continued)

*Primary Examiner* — Tan Le
(74) *Attorney, Agent, or Firm* — Volpe Koenig

(57) ABSTRACT

A plate is to be installed on an installation surface for supporting an object to be supported on the installation surface. The plate includes a plate part having a support surface for supporting the object to be supported, and an adjustment part attached to the plate part and capable of adjusting a height position of the support surface relative to the installation surface.

5 Claims, 12 Drawing Sheets

(56) References Cited

FOREIGN PATENT DOCUMENTS

| | | | |
|---|---|---|---|
| JP | 06-047473 | U | 6/1994 |
| JP | 11-050585 | A | 2/1999 |
| JP | 3044011 | B2 * | 5/2000 |
| JP | 2001159240 | A * | 6/2001 |
| JP | 2014-193026 | A | 10/2014 |
| JP | 2015-119510 | A | 6/2015 |
| JP | 2017-124671 | A | 7/2017 |
| JP | 2017-212302 | A | 11/2017 |
| KR | 101039599 | B1 | 6/2011 |
| KR | 101298395 | B1 * | 8/2013 |

* cited by examiner

PLATE AND PLATE SYSTEM

TECHNICAL FIELD

The present disclosure relates to a plate and a plate system.

BACKGROUND ART

A plate that supports an object to be supported is known, for example, as disclosed in Patent Literature 1. The plate disclosed in Patent Literature 1 supports a power transmission coil device, as the object to be supported, on a vehicle driving surface.

CITATION LIST

Patent Literature

Patent Literature 1: Japanese Unexamined Patent Publication No. 2015-119510

SUMMARY OF INVENTION

Technical Problem

For example, if an installation surface on which the plate is to be installed is uneven or sloped, the object to be supported may be installed at an angle or may not be installed at a desired height position when supported by the plate. Thus, there is a need that the plate be able to install an object to be supported at a desired height position and in a desired tilt state.

The present disclosure describes a plate and a plate system which are capable of supporting an object to be supported at a desired height position and in a desired tilt state.

Solution to Problem

An embodiment of the present disclosure is a plate to be installed on an installation surface for supporting an object to be supported on the installation surface, the plate including a plate part having a support surface for supporting the object to be supported, and an adjustment part attached to the plate part and capable of adjusting a height position of the support surface relative to the installation surface.

Effects of Invention

The present disclosure is capable of supporting an object to be supported at a desired height position and in a desired tilt state.

BRIEF DESCRIPTION OF DRAWINGS

FIG. 5 FIG. 5A is a schematic front view of a vehicle on the plate system.

FIG. 12 FIG. 12A is a top view of the plate system of a sixth variation.

DESCRIPTION OF EMBODIMENTS

Figure 1:
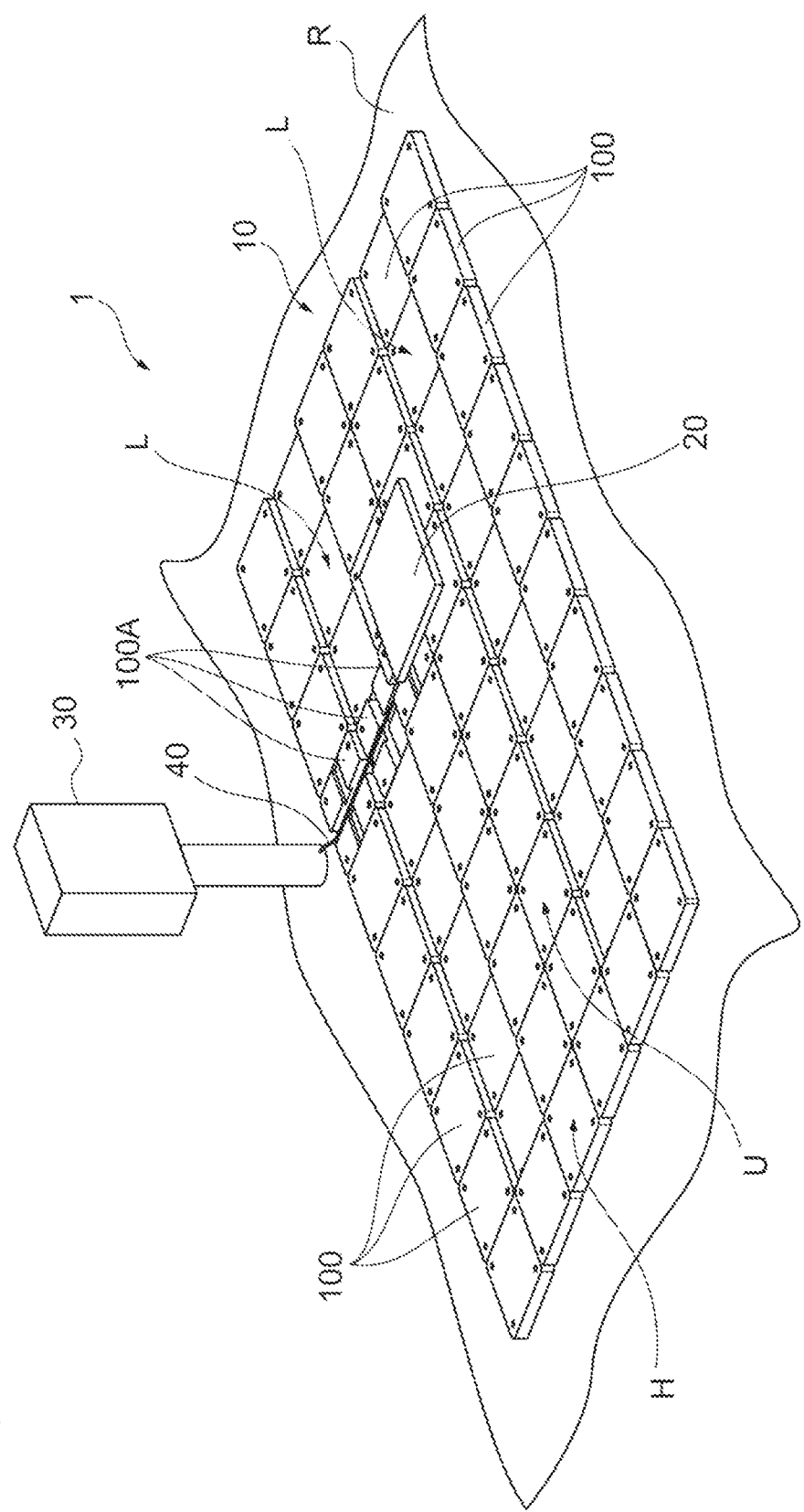
FIG. 1 A perspective view showing a schematic configuration of a power transmitter according to an embodiment.

An embodiment of the present disclosure is a plate to be installed on an installation surface for supporting an object to be supported on the installation surface, the plate including a plate part having a support surface for supporting the object to be supported, and an adjustment part attached to the plate part and capable of adjusting a height position of the support surface relative to the installation surface.

This plate includes the adjustment part that is capable of adjusting the height position of the support surface of the plate part. Having the adjustment part enables the plate to adjust the height position of the support surface of the plate part. The plate is also capable of adjusting the tilt of the support surface by the height position of only one end of the plate part being adjusted by the adjustment part. The plate is thus capable of supporting the object to be supported at a desired height position and in a desired tilt state.

The plate part may include a through hole passing therethrough from an opposite surface being a surface opposite the support surface, to the support surface, the through hole having a thread formed on an inner surface thereof, the opposite surface may face the installation surface, the adjustment part may include a screw engaging the thread formed in the through hole, a head portion of the screw may be positioned between the support surface and the opposite surface in the through hole, and a distal portion of the screw may protrude from the opposite surface. In this case, a protrusion length of the distal portion of the screw protruding from the opposite surface of the plate part is changed by the screw being rotated. The adjustment part is thus capable of adjusting the distance between the opposite surface of the plate part and the installation surface, that is, the height position of the support surface of the plate part relative to the installation surface. Additionally, since the head portion of the screw can be manipulated from the support surface of the plate part, an installer of the plate can easily adjust the height position and tilt state of the support surface. The head portion of the screw does not protrude from the support surface of the plate part, so that the head portion of the screw does not interfere with the object to be supported that is to be installed on the support surface.

The adjustment part may further include a support pad attached to the distal portion of the screw, to be brought into contact with the installation surface, and the screw may be rotatable and tiltable relative to the support pad. In this case, the plate is capable of installing the support pad according to the slope of the installation surface when the installation surface is sloped. Additionally, the support pad does not co-rotate with the screw.

The support surface may have a groove formed thereon. In this case, the plate is capable of accommodating, in the groove, a cable or the like that connects to the object to be supported.

The support surface may have a plurality of the grooves having different depths formed thereon. In this case, the plate is capable of accommodating, in the grooves, a cable or the like that connects to the object to be supported. When the heights of the support surfaces of adjacent plates are different, the installer of the plates can connect the grooves by selecting the grooves corresponding to the heights of the plate parts so that the grooves are continuous and uninterrupted in a height direction.

Another embodiment of the present disclosure is a plate system including a plurality of the plates, wherein the plurality of the plates may be installed aligned on the installation surface, and the support surface of a first plate of the plurality of the plates may have a height position that is different from a height position of the support surface of a second plate of the plurality of the plates. In this case, in the plate system, a step portion between the first plate and the second plate is capable of functioning as a locator when supporting the object to be supported by the support surface.

The plate system may include a connection part for connecting the plates adjacent to one another so as to be able to allow differences in height from the installation surface. In this case, the connection part is capable of connecting the plates adjacent to one another when the plates are installed such that the heights of the support surfaces of the plates are different.

Embodiments of a plate and a plate system according to the present disclosure will be described below with reference to the drawings. It should be noted that like elements are given like reference signs in the description of the drawings and redundant explanation is omitted.

Figure 5A:
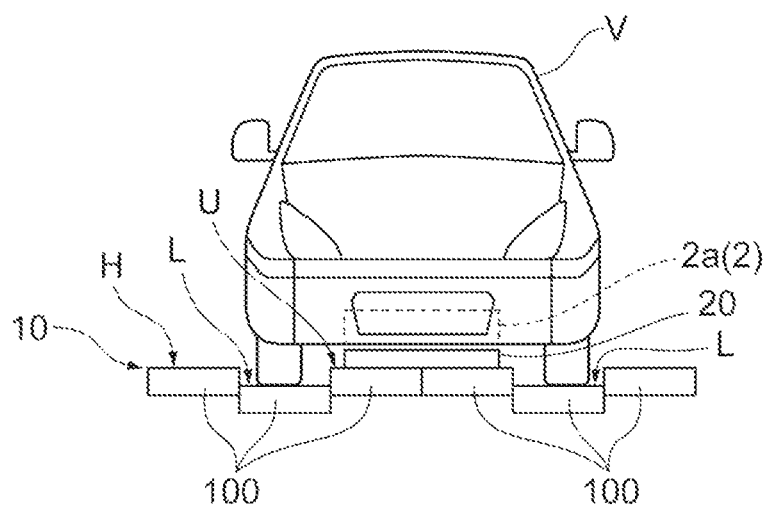

As shown in FIG. 1, a power transmitter 1 is installed on the ground and wirelessly transmits power to a power receiver 2 of a vehicle V (see FIG. 5A). The power transmitter 1 includes a plate system 10, a power transmission coil part (object to be supported) 20, a power conversion part 30, and a cable 40. The plate system 10 is installed on a road surface (installation surface) R on which a vehicle (object to be supported) V runs. A top surface U of the plate system 10 forms a parking space (road surface for parking) for when the power transmission coil part 20 supplies power to the vehicle V. The plate system 10 supports the power transmission coil part 20 and the vehicle V on the road surface R. The power receiver 2 of the vehicle V receives power from the power transmission coil part 20 with the vehicle V stopped on the plate system 10.

The power transmission coil part 20 is attached to the top surface U of the plate system 10. The power transmission coil part 20 generates a magnetic field by power supplied from the power conversion part 30 through the cable 40. The power transmission coil part 20 wirelessly transmits power to a power reception coil part 2a in the power receiver 2 of the vehicle V using, for example, magnetic coupling between coils by magnetic resonance, electromagnetic induction, or the like. The power received by the power receiver 2 is used, for example, to charge a battery mounted on the vehicle V.

The power conversion part 30 converts power supplied from a power supply source not shown to a desired power, and supplies the power to the power transmission coil part 20 through the cable 40. The cable 40 is, for example, a high voltage cable.

Details of the plate system 10 will now be described. The plate system 10 includes a plurality of plates 100 and a plurality of plates 100A. The plurality of plates 100 and 100A are disposed aligned on the road surface R.

Figure 2:
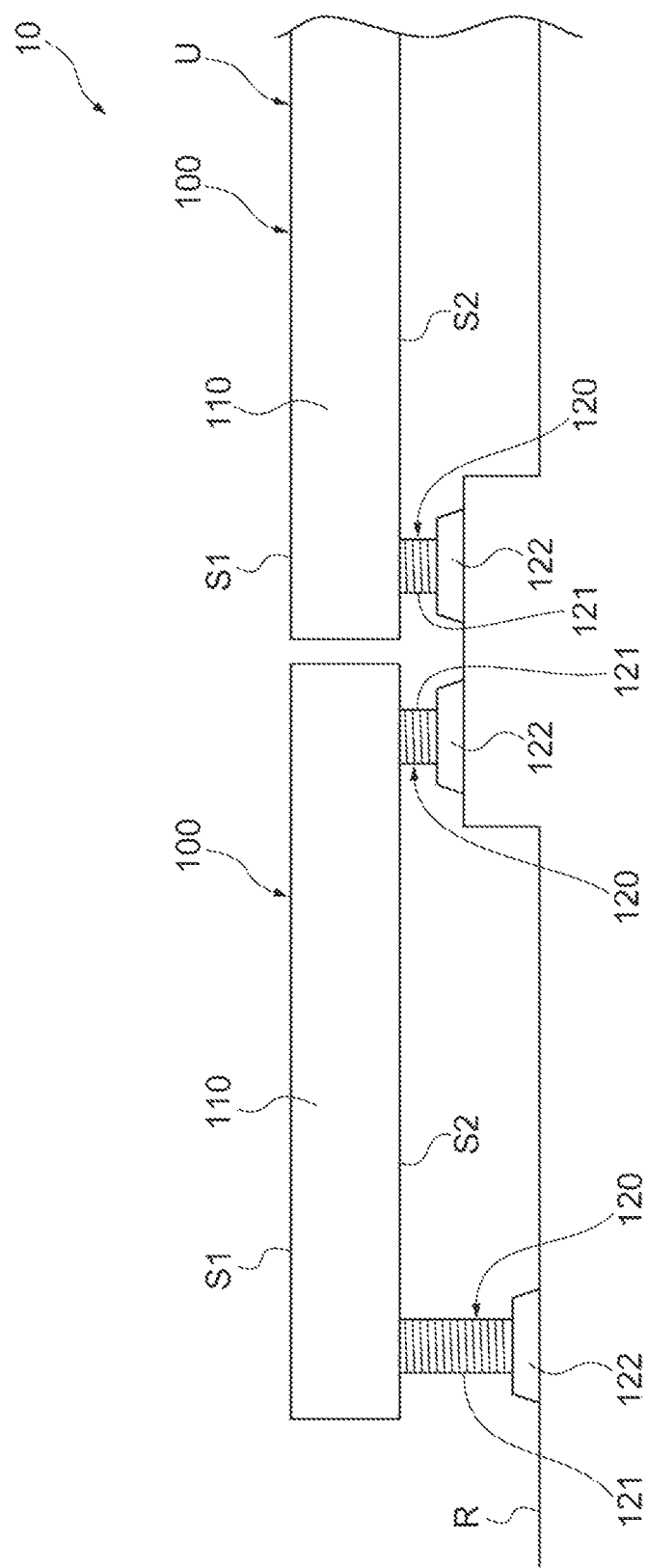
FIG. 2 A side view of a plate system of FIG. 1.

As shown in FIG. 2, each plate 100 includes a plate part 110 and adjustment parts 120. The plate part 110 is formed in a square plate shape in this embodiment. The plate part 110 is formed, for example, of resin. The plate part 110 has a support surface S1 and an opposite surface S2. The opposite surface S2 is the surface opposite the support surface S1. Specifically, the top surface of the plate part 110 is the support surface S1 that supports the power transmission coil part 20 and the vehicle V. The support surface S1 of the plate part 110 constitutes the top surface U of the plate system 10. The bottom surface of the plate part 110 is the opposite surface S2 that faces the road surface R.

Figure 3:
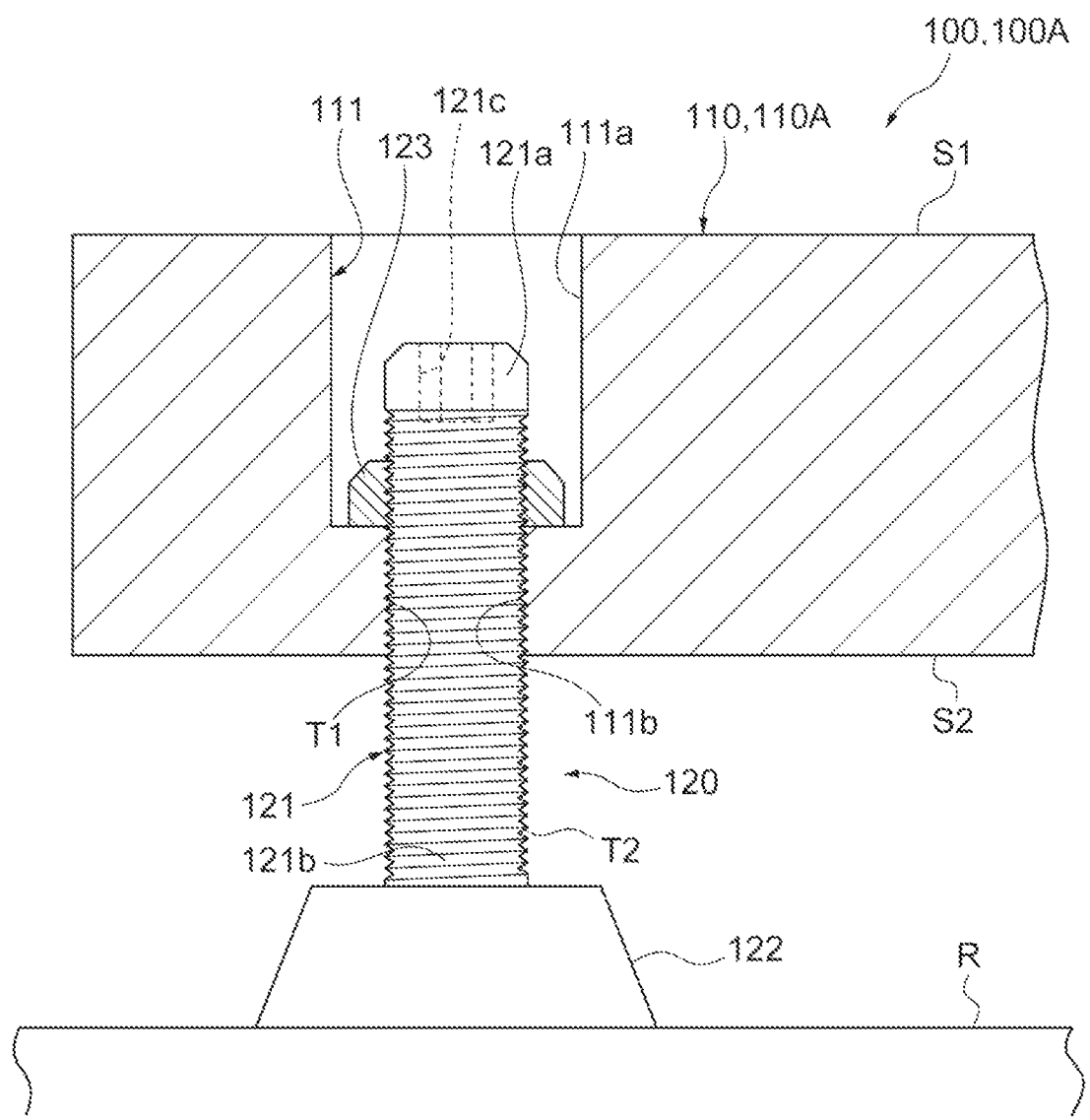
FIG. 3 A cross-sectional view of an area around an adjustment part of a plate of FIG. 1.

As shown in FIG. 3, the plate part 110 has a through hole 111 that passes therethrough from the opposite surface S2 to the support surface S1. In this embodiment, the through hole 111 is formed in the vicinity of each of the four corners of the plate part 110. The through hole 111 has a large diameter portion 111a and a small diameter portion 111b. The large diameter portion 111a is a hole that has a diameter larger than that of the small diameter portion 111b. The large diameter portion 111a is located more toward the support surface S1 than the small diameter portion 111b. The small diameter portion 111b has a thread T1 formed on an inner surface thereof.

The adjustment parts 120 are attached to the plate part 110. The adjustment parts 120 adjust a height position of the support surface S1 relative to the road surface R by moving the plate part 110 up and down relative to the road surface R.

Each adjustment part 120 includes a screw 121, a support pad 122, and a nut 123. In this embodiment, the screw 121 has a hexagonal hole 121c formed in a head portion 121a thereof. The screw 121 is rotated by an Allen wrench inserted into the hexagonal hole 121c. The screw 121 is inserted into the through hole 111 and a thread T2 of the screw 121 engages the thread T1 of the small diameter portion 111b. The head portion 121a of the screw 121 is positioned between the support surface S1 and the opposite surface S2 in the through hole 111. In other words, the head portion 121a of the screw 121 does not protrude from the support surface S1. A distal portion 121b of the screw 121 protrudes from the opposite surface S2. The nut 123 is attached to the screw 121 in the large diameter portion 111a. The nut 123 functions as a detent to prevent unintentional rotation of the screw 121.

The support pad 122 is attached to the distal portion 121b of the screw 121. It should be noted that the support pad 122 is attached to the distal portion 121b such that the screw 121 is rotatable relative to the support pad 122 and such that the screw 121 is tiltable relative to the support pad 122. The support pad 122 is placed on the road surface R and contacts the road surface R.

A protrusion length of the distal portion 121b of the screw 121 from the opposite surface S2 is adjusted by the screw 121 being rotated. That is, the height position of the support surface S1 of the plate part 110 relative to the road surface R is adjusted by the screw 121 being rotated. The plate 100 is thus capable of having the height position and tilt of the support surface S1 in a desired state even if the road surface R is, for example, uneven or sloped. In this embodiment, the tilt of the support surface S1 is adjusted by the adjustment parts 120 so that the support surface S1 is horizontal.

Figure 4:
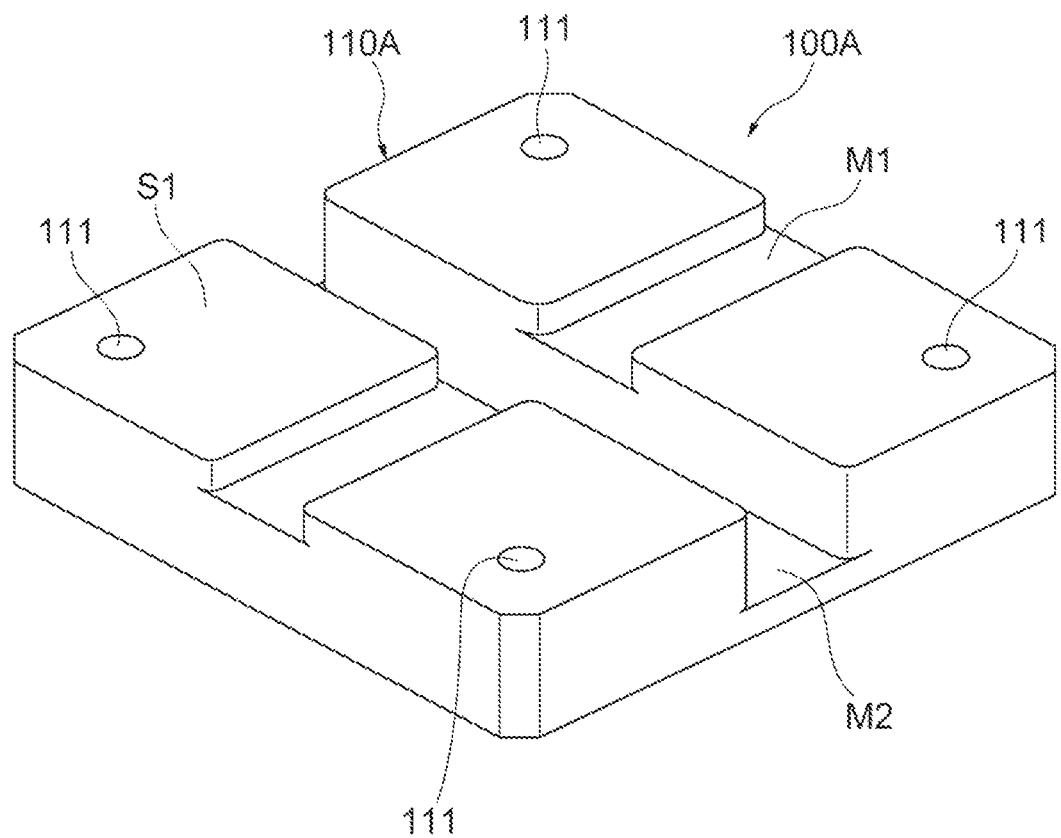
FIG. 4 A perspective view showing a plate part of FIG. 1 having grooves.

As shown in FIGS. 3 and 4, each plate 100A includes a plate part 110A and the adjustment parts 120. The plate part 110A is formed, for example, of resin. The support surface S1 of the plate part 110A has a groove M1 and a groove M2 which have different depths. The depth of the groove M1 is less than the depth of the groove M2. The groove M1 and the groove M2 criss-cross on the support surface S1. The plate part 110A has the through holes 111, similarly to the plate part 110. The plate part 110A has the adjustment parts 120 attached thereto, similarly as in the plate 100. In other words, the plate 100A and the plate 100 differ only in the presence or absence of the grooves M1 and M2. The height position of the support surface S1 of the plate part 110A from the road surface R is adjusted by the adjustment parts 120, similarly as in the plate 100. The plate 100A is thus capable of having the height position and tilt of the support surface S1 in a desired state even if the road surface R is, for example, uneven or sloped.

As shown in FIG. 1, the top surface U of the plate system 10 has a low level region L that is formed by the support surfaces S1 of the plates 100 and 100A located at a first height position, and a high level region H that is formed by the support surfaces S1 thereof located at a second height position which is higher than the first height position. That is, the height position of the support surfaces S1 of the plates (first plates) 100 and 100A that form the low level region L is different from the height position of the plates (second plates) 100 and 100A that form the high level region H.

Figure 5B:
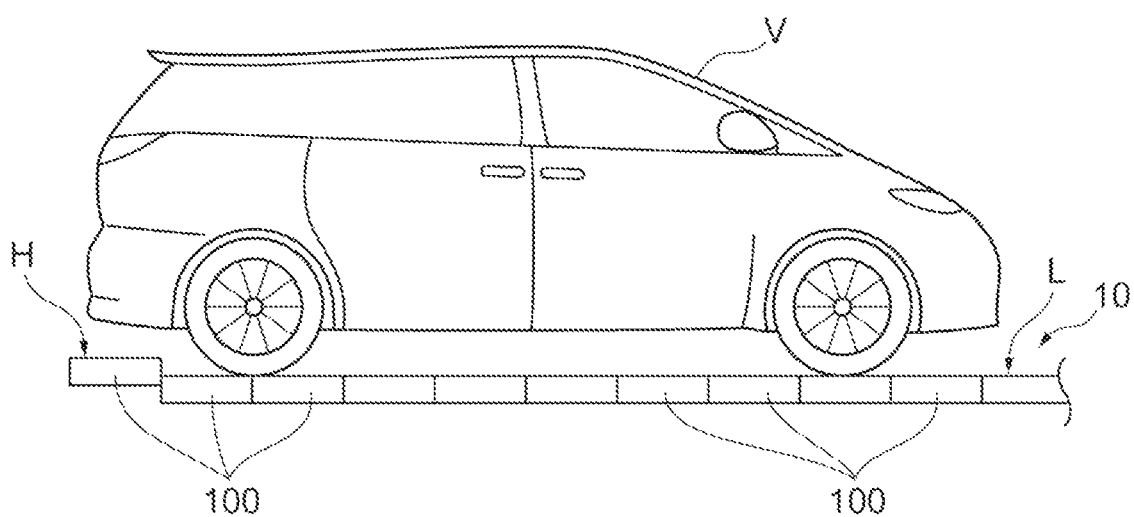
FIG. 5B is a schematic side view of the vehicle on the plate system.

As shown in FIGS. 1, 5A, and 5B, two low level regions L are formed extending belt-like so as to sandwich the power transmission coil part 20 therebetween. The distance between the two low level regions L is the distance between tires on the left and right of the vehicle V. It should be noted that the adjustment parts 120 are omitted in FIGS. 5A and 5B. As shown in FIGS. 1 and 5B, the high level region H is connected to edges of the low level regions L that extend belt-like. When receiving power from the power transmitter 1, the vehicle V advances onto the plate system 10 such that the tires move over the low level regions L. The vehicle V can use steps between the low level regions L and the high level region H as a positioning guide in the front back direction and the left right direction of the vehicle V.

Figure 6:
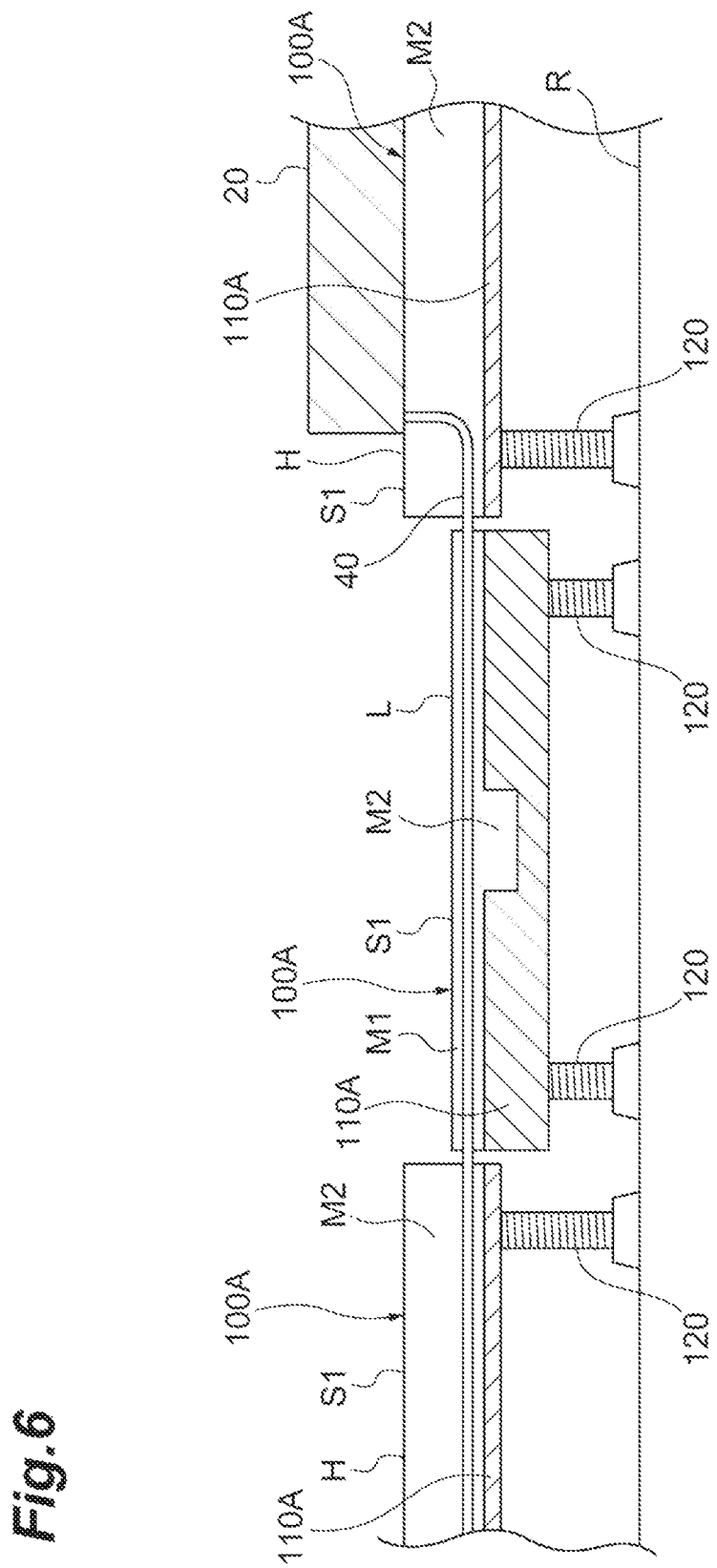
FIG. 6 A cross-sectional view showing a cable disposed in the grooves of the plates.

As shown in FIG. 1, the plates 100A are arranged in a region between the power transmission coil part 20 and the power conversion part 30. As shown in FIGS. 1 and 6, the cable 40 is disposed inside the groove M1 and the grooves M2 of the plates 100A. The plates 100A that form the high level region H are disposed such that the cable 40 passes through the grooves M2. The plate 100A that forms the low level region L is disposed such that the cable 40 passes through the groove M1. Thus, as shown in FIG. 6, the groove M1 of the plate 100A that forms the low level region L and the grooves M2 of the plates 100A that form the high level region H are continuous and uninterrupted in a height direction at step portions between the low level region L and the high level region H.

As described above, the plates 100 and 100A that compose the plate system 10 have the adjustment parts 120 that are capable of adjusting the height positions of the support surfaces S1 of the plate parts 110 and 110A. Having the adjustment parts 120 enables the plate 100 to adjust the height position of the support surface S1 of the plate part 110. Additionally, the plate 100 is capable of adjusting the tilt of the support surface S1 by the height position of only one end of the plate part 110 being adjusted by the adjustment parts 120. The plate 100A is capable of adjusting the height position and the tilt of the support surface S1, similarly as in the plate 100. The plates 100 and 100A are thus capable of supporting the power transmission coil part 20 and the vehicle V at a desired height position and in a desired tilt state.

Each adjustment part 120 includes the screw 121 disposed in the through hole 111. The protrusion length of the distal portion 121b of the screw 121 from the opposite surface S2 of the plate parts 110 and 110A is adjusted by the screw 121 being rotated. The adjustment parts 120 are thus capable of adjusting the distance between the opposite surface S2 of the plate parts 110 and 110A and the road surface R, that is, the height position of the support surface S1 relative to the road surface R. Additionally, since the head portion 121a of the screw 121 can be manipulated from the support surface S1 of the plate parts 110 and 110A, an installer of the plates 100 and 100A can easily adjust the height positions and tilt states of the support surfaces S1. The head portion 121a of the screw 121 does not protrude from the support surface S1 of the plate parts 110 and 110A, so that the head portion 121a of the screw 121 does not interfere with the power transmission coil part 20 and the like that are installed on the support surface S1.

The screw 121 is attached to the support pad 122 so as to be rotatable and tiltable relative to the support pad 122. The plates 100 and 100A are thus capable of installing the support pads 122 according to the slope of the road surface R when the road surface R is sloped. Additionally, the support pad 122 does not co-rotate with the screw 121.

The support surface S1 of the plate 100A has the grooves M1 and M2. The plate 100A is thus capable of accommodating the cable 40 that connects to the power transmission coil part 20 in the grooves M1 and M2. The road surface R may, for example, be made of reinforced concrete. In this case, for example, high-frequency current flowing through the cable 40 may affect the metal (reinforcing steel) in the road surface R. Even in such case, the plate 100A is capable of preventing the impact on the metal in the road surface R since the cable 40 is accommodated away from the road surface R.

The support surface S1 of the plate 100A has the groove M1 and the groove M2 having different depths. When the heights of the support surfaces S1 of adjacent plates 100A are different, the installer of the plates 100A can connect the grooves by selecting the grooves M1 and M2 corresponding to the heights of the plate parts 110A so that the groove M1 of the plate 100A that forms the low level region L and the groove M2 of the plate 100A that forms the high level region H are continuous and uninterrupted in the height direction. The cable 40 can thus be prevented from being exposed at the step portion between the plate 100A that forms the low level region L and the plate 100A that forms the high level region H.

The top surface U of the plate system 10 has the high level region H and the low level region L formed by the heights of the plates 100 and 100A being adjusted. Thus, in the plate system 10, the step portions between the high level region H and the low level region L are capable of functioning as a locator when supporting the vehicle V by the top surface U.

Although the embodiments of the present disclosure have been described above, the present disclosure is not limited thereto.

The groove M1 and the groove M2 formed on the plate 100A need not be arranged in a criss-cross manner. For example, the groove M1 and the groove M2 may be formed on the support surface S1 so as to be parallel to each other. The plate part 110A may have a plurality of grooves having the same depth. The plate part 110A is not limited to having a plurality of grooves, and may have only one groove. The support surface S1 of the plate 100A may have a cover that covers the grooves M1 and M2. This cover may be positioned by using the through holes 111, the groove M1, etc., of the plate part 110A.

Although the power transmission coil part 20 and the vehicle V are supported by the plurality of the plates 100 and 100A, the power transmission coil part 20, etc., may be supported by a single plate 100 or 100A.

The screw 121 of the adjustment part 120 is not limited to a screw having the hexagonal hole 121c, and other types of screws may be used. The adjustment part 120 need not have the support pad 122. In this case, the distal portion of the screw 121 may directly contact the road surface R.

First Variation

Figure 7:
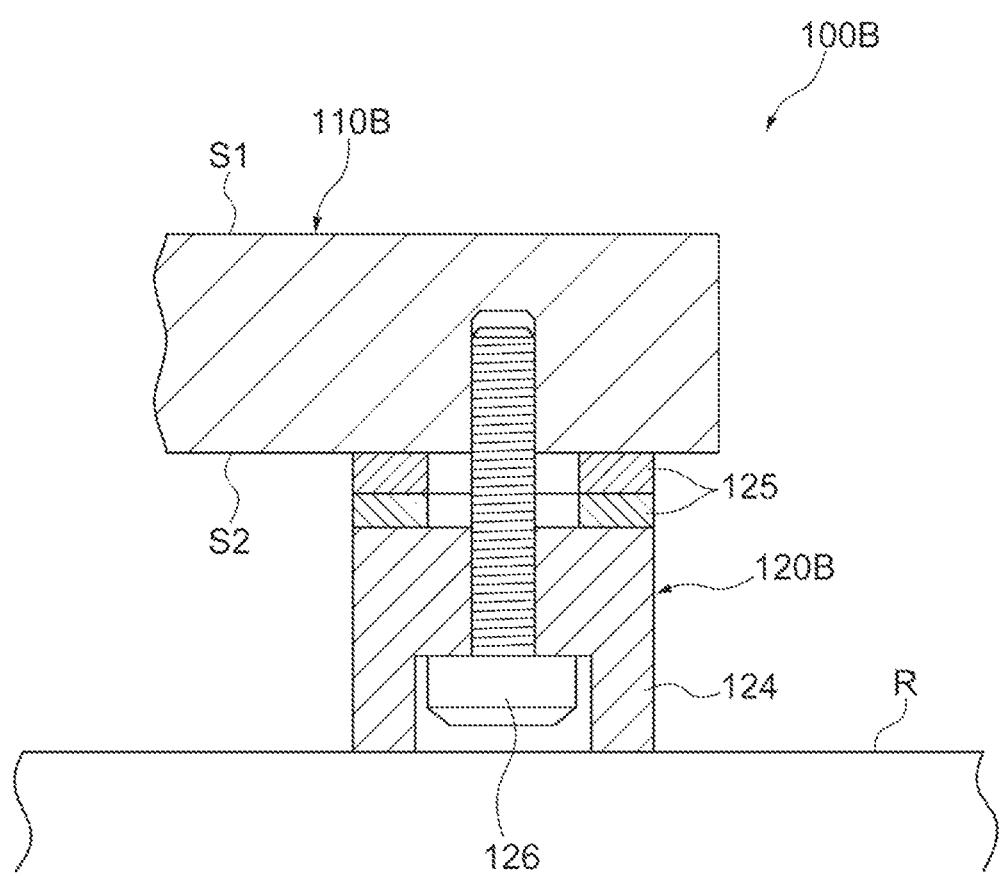
FIG. 7 A cross-sectional view showing the adjustment part of a first variation.

A first variation of the adjustment parts that adjust the height position of the support surface S1 will now be described. As shown in FIG. 7, a plate 100B includes a plate part 110B and adjustment parts 120B. The plate part 110B has a support surface S1 and an opposite surface S2, similarly to the plate part 110. The support surface S1 of the plate part 110B may have a groove, similarly to the plate part 110A. The adjustment parts 120B are attached to the opposite surface S2 of the plate part 110B. The adjustment parts 120B adjust the height position of the support surface S1 relative to the road surface R.

Each adjustment part 120B includes a leg part 124, a spacer 125, and a screw 126. The leg part 124 is fixed to the opposite surface S2 of the plate part 110B by the screw 126 with the spacer 125 sandwiched between the leg part 124 and the opposite surface S2. The installer of the plate 100B can adjust the height position of the support surface S1 relative to the road surface R by changing the number of the spacers 125 or by changing the thickness of the spacer 125 to be used.

Second Variation

Figure 8:
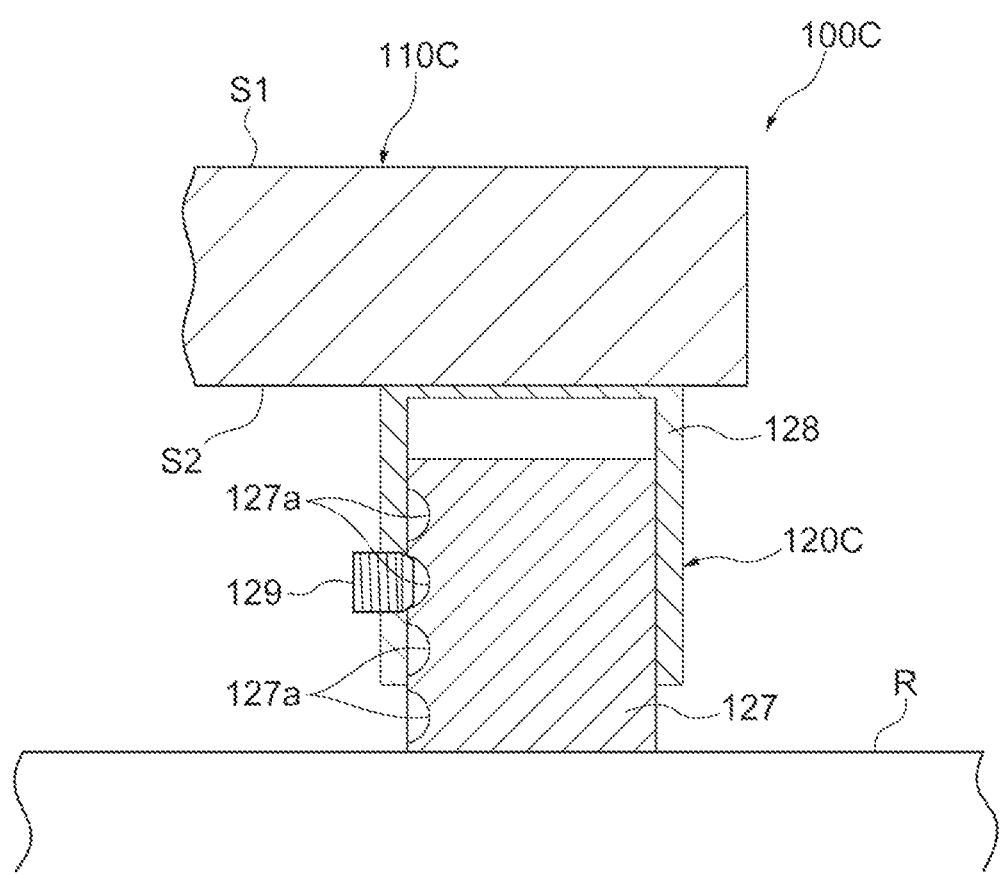
FIG. 8 A cross-sectional view showing the adjustment part of a second variation.

A second variation of the adjustment parts that adjust the height position of the support surface S1 will now be described. As shown in FIG. 8, a plate 100C includes a plate part 110C and adjustment parts 120C. The plate part 110C has a support surface S1 and an opposite surface S2, similarly to the plate part 110. The support surface S1 of the plate part 110C may have a groove, similarly to the plate part 110A. The adjustment parts 120C are attached to the opposite surface S2 of the plate part 110C. The adjustment parts 120C adjust the height position of the support surface S1 relative to the road surface R.

Each adjustment part 120C includes an inner tube 127, an outer tube 128, and a screw 129. The outer tube 128 is attached to the opposite surface S2 of the plate part 110C. The outer tube 128 is formed in a tubular shape and has an opening facing the road surface R. The outer tube 128 houses the inner tube 127 therein. The screw 129 is, for example, a set screw. The screw 129 engages a threaded hole formed in the outer tube 128. A distal portion of the screw 129 protrudes from an inner surface of the outer tube 128. The inner tube 127 has a plurality of recessed portions 127a formed on an outer surface thereof. The inner tube 127 is fixed to the outer tube 128 by the distal portion of the screw 129 being inserted into one of the recessed portions 127a and pressing the inner tube 127 against the inner surface of the outer tube 128. The installer of the plate 100C can change the length of the adjustment part 120C by changing the recessed portion 127a into which the distal portion of the screw 129 is inserted. That is, the installer of the plate 100C can adjust the height position of the support surface S1 relative to the road surface R by changing the recessed portion 127a into which the distal portion of the screw 129 is inserted.

Third Variation

Figure 9:
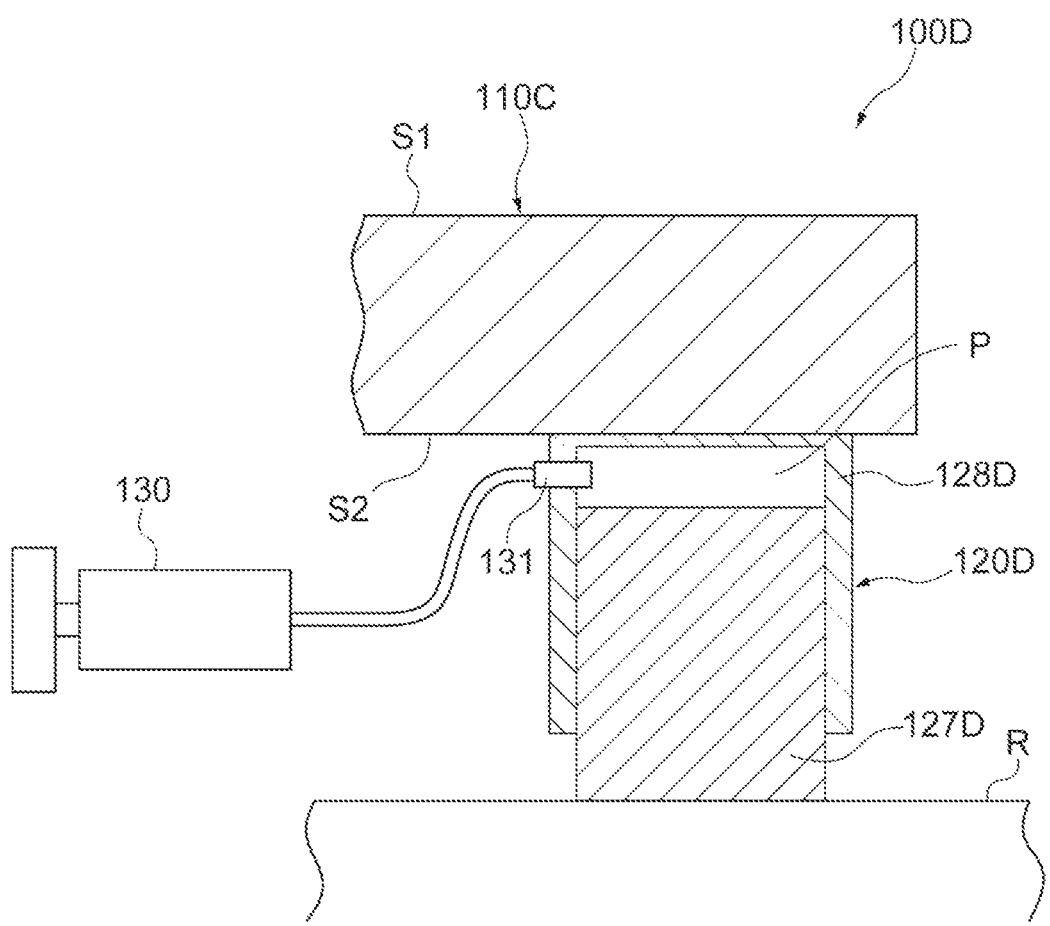
FIG. 9 A cross-sectional view showing the adjustment part of a third variation.

A third variation of the adjustment parts that adjust the height position of the support surface S1 will now be described. As shown in FIG. 9, a plate 100D includes a plate part 110C, adjustment parts 120D, and an injector 130. The adjustment parts 120D are attached to an opposite surface S2 of the plate part 110C. The adjustment parts 120D adjust the height position of a support surface S1 relative to the road surface R.

Each adjustment part 120D includes an inner tube 127D and an outer tube 128D. The outer tube 128D is attached to the opposite surface S2 of the plate part 110C. The outer tube 128D is formed in a tubular shape and has an opening facing the road surface R. The outer tube 128D houses the inner tube 127D therein. A cylinder chamber P is formed inside the outer tube 128D above the inner tube 127D. An incompressible liquid is supplied to the cylinder chamber P from the injector 130. The outer tube 128D has a valve 131 formed to prevent the supplied liquid from flowing out from the cylinder chamber P. A seal member or the like may be disposed between an inner surface of the outer tube 128D and an outer surface of the inner tube 127D so that the liquid does not flow out of the gap between the outer tube 128D and the inner tube 127D. The position of the inner tube 127D relative to the outer tube 128D changes according to the amount of the liquid supplied to the cylinder chamber P from the injector 130.

The installer of the plate 100D can change the length of the adjustment part 120D by changing the amount of the liquid supplied to the cylinder chamber P from the injector 130. That is, the installer of the plate 100D can adjust the height position of the support surface S1 relative to the road surface R by changing the amount of the liquid supplied to the cylinder chamber P.

Although the adjacent plates 100, etc., are not connected to one another in the plate system 10 according to the embodiment, the adjacent plates 100, etc., may be connected to one another. Variations of the plate system in which the plates are connected to one another will be described below.

Fourth Variation

Figure 10:
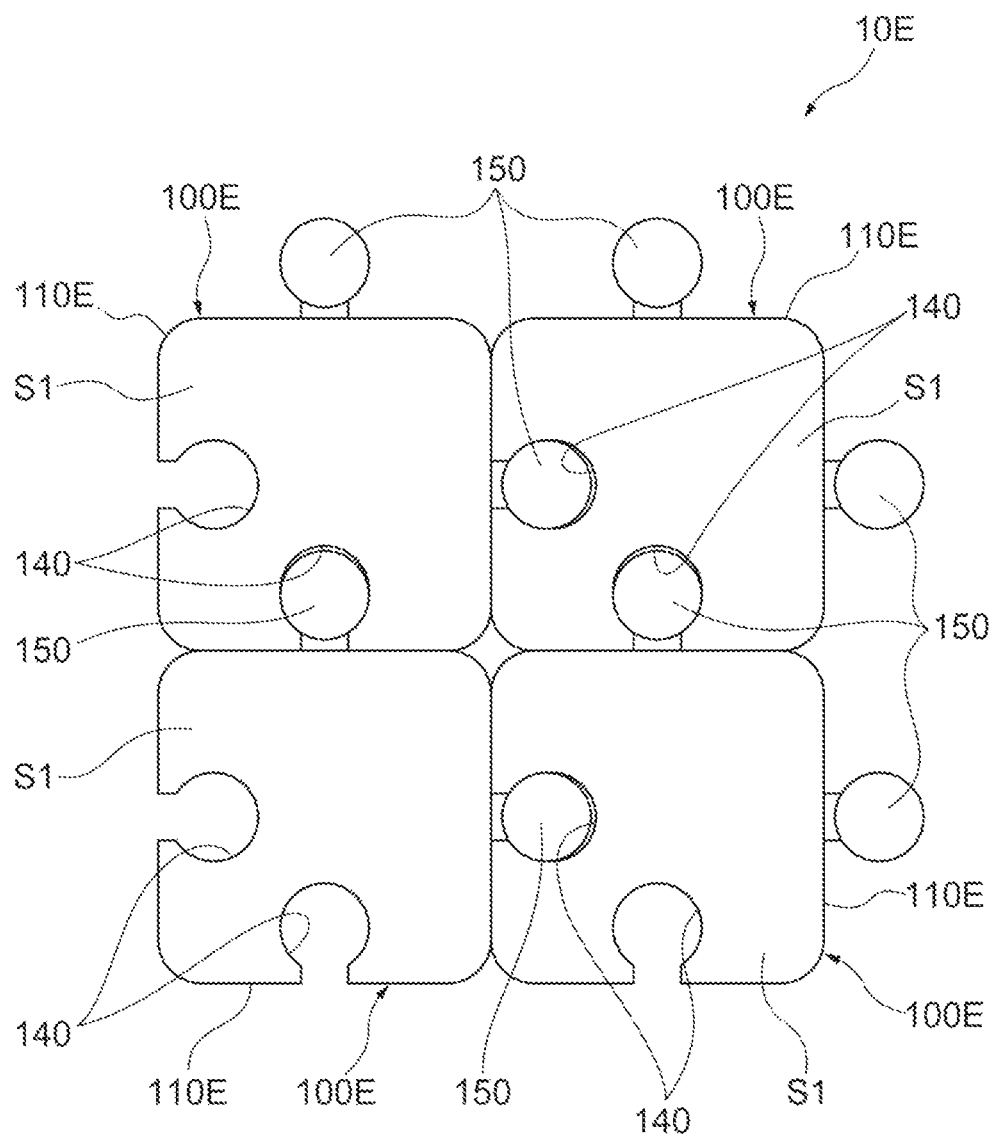
FIG. 10 A top view of the plate system of a fourth variation.

As shown in FIG. 10, a plate system 10E includes a plurality of plates 100E. Each plate 100E includes a plate part 110E and adjustment parts. The adjustment parts 120, etc., described in the embodiments, etc., are used as the adjustment parts of the plate 100E. The plate part 110E has a support surface S1 and an opposite surface, similarly to the plate part 110. The support surface S1 of the plate part 110E may have a groove M1, etc., similarly to the plate part 110A.

The plate part 110E has a connection part 150 formed on a side surface thereof. The connection part 150 protrudes from the side surface of the plate part 110E. A distal portion of the connection part 150 is wider than a proximal portion of the connection part 150. The plate part 110E has a notch part 140 formed on an edge portion. The notch part 140 has a shape that corresponds to the connection part 150. In this embodiment, the connection part 150 is formed on two adjacent sides of the four sides of the plate part 110E, and the notch part 140 is formed on the remaining two sides, when seen from the support surface S1 of the plate part 110E.

The plates 100E are connected by the connection part 150 of one of adjacent plates 100E being fitted into the notch part 140 of another of the adjacent plates 100E. It should be noted that the connection part 150 may be flexible. Additionally, the connection part 150 may be configured to fit into the notch part 140 so as to have a predetermined looseness with respect the notch part 140. In these cases, the connection part 150 is capable of connecting the plates 100E so as to be able to allow the difference between the heights of the support surfaces S1 when the heights of the support surfaces S1 are different between the adjacent plates 100E.

Fifth Variation

Figure 11:
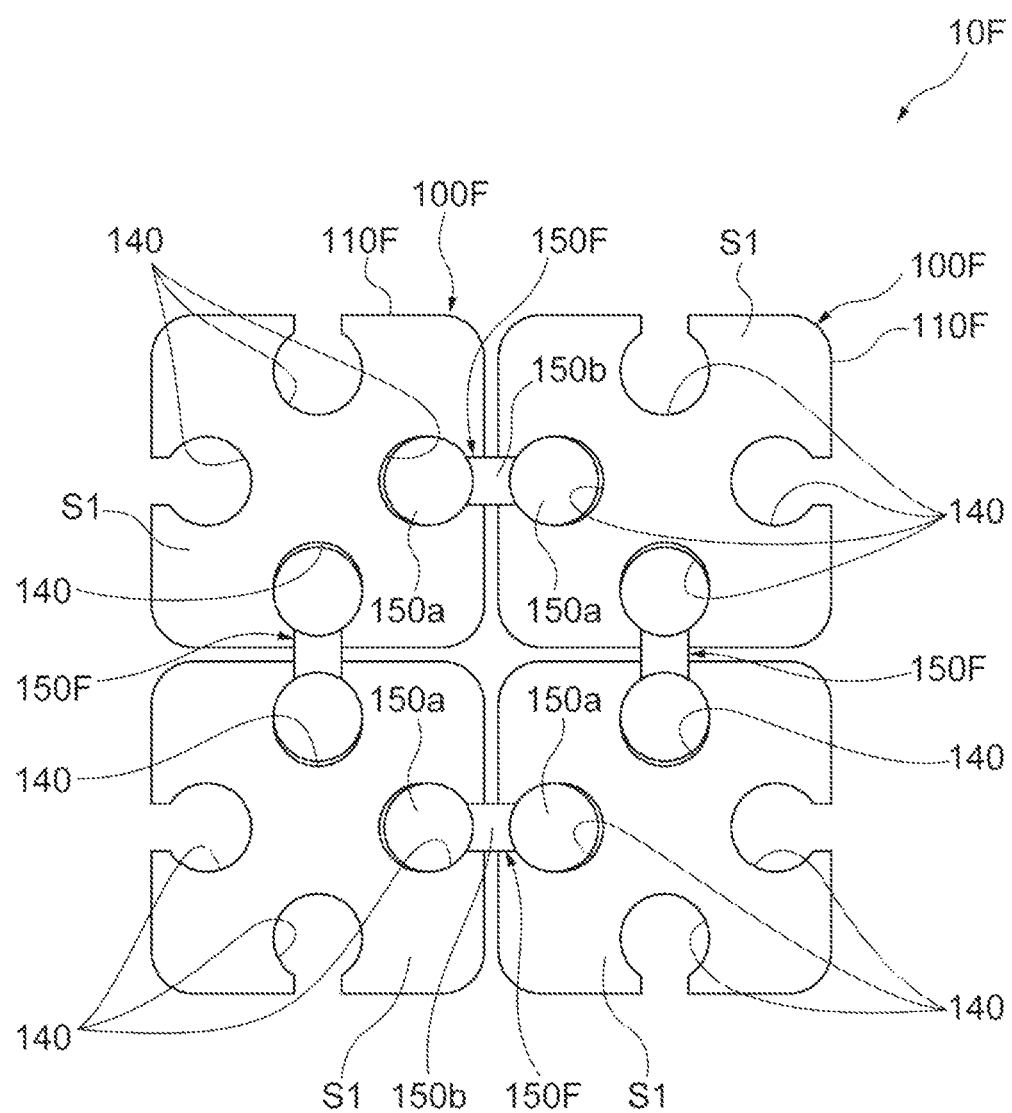
FIG. 11 A top view of the plate system of a fifth variation.

As shown in FIG. 11, a plate system 10F includes a plurality of plates 100F and a plurality of connection parts 150F. Each plate 100F includes a plate part 110F and adjustment parts. The adjustment parts 120, etc., described in the embodiments, etc., are used as the adjustment parts of the plate 100F. The plate part 110F has a support surface S1 and an opposite surface, similarly to the plate part 110. The support surface S1 of the plate part 110F may have a groove M1, etc., similarly to the plate part 110A.

The connection parts 150F connect the adjacent plates 100F to one another. Each connection part 150F has two fitting parts 150a and a connection body 150b. The connection body 150b connects the two fitting parts 150a. The connection body 150b has a width that is smaller than the size of the fitting parts 150a. The plate part 110F has notch parts 140 formed on edge portions thereof. The notch parts 140 have shapes that correspond to the fitting parts 150a.

One of the fitting parts 150a of the connection part 150F is fitted into the notch part 140 of one of adjacent plates 100F. The other fitting part 150a of the connection part 150F is fitted into the notch part 140 of another of the adjacent plates 100F. The connection parts 150F connect the plates 100F to one another with predetermined gaps between the adjacent plates 100.

It should be noted that the connection body 150b of the connection part 150F may be flexible. Additionally, the fitting parts 150a of the connection part 150F may be configured to fit into the notch parts 140 so as to have a predetermined looseness with respect to the notch parts 140. In these cases, the connection part 150F is capable of connecting the plates 100F so as to be able to allow the difference between the heights of the support surfaces S1 when the heights of the support surfaces S1 are different between the adjacent plates 100F. The connection parts 150F connect the plates 100F to one another with predetermined gaps between the adjacent plates 100F. The installer of the plates 100F can thus easily adjust the height and the tilt state of the support surface S1 of the plate 100F independent of the adjacent plates 100F when adjusting the heights of the support surfaces S1 of the plates 100F.

Sixth Variation

Figure 12A:
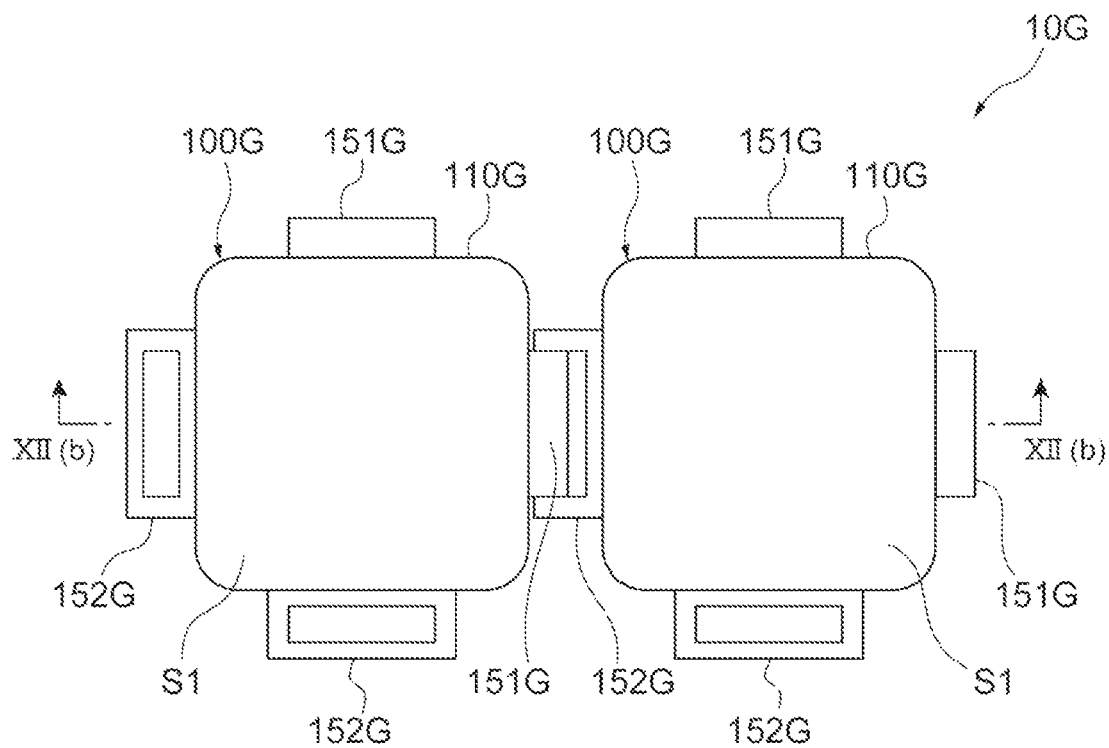
Figure 12B:
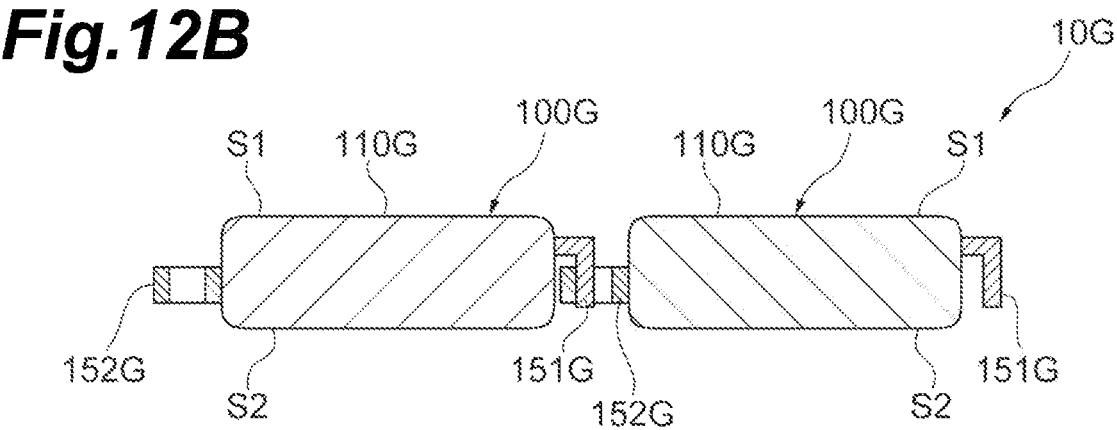
FIG. 12B is a cross-sectional view taken along the line XII(b)-XII(b) in FIG. 12A.

As shown in FIGS. 12A and 12B, a plate system 10G includes a plurality of plates 100G. Each plate 100G includes a plate part 110G and adjustment parts. It should be noted that the adjustment parts are omitted in FIG. 12B. The adjustment parts 120, etc., described in the embodiments, etc., are used as the adjustment parts of the plate 100G. The plate part 110G has a support surface S1 and an opposite surface S2, similarly to the plate part 110. The support surface S1 of the plate part 110G may have a groove M1, etc., similarly to the plate part 110A.

The plate part 110G has a hook part 151G and a receiving part 152G on side surfaces thereof. The receiving part 152G is formed in a loop shape. The hook part 151G is shaped to latch onto the receiving part 152G by a distal portion of the hook part 151G being inserted into the receiving part 152G. In this embodiment, the hook part 151G is formed on two adjacent sides of the four sides of the plate part 110G, and the receiving part 152G is formed on the remaining two sides, when seen from the support surface S1 of the plate part 110G.

The plates 100G are connected by the hook part 151G of one of adjacent plates 100G being fitted into the receiving part 152G of the other of the adjacent plates 100G. The hook part 151G and the receiving part 152G thus function as a connection part that connects the plates 100G to one another. It should be noted that at least one of the hook part 151G and the receiving part 152G may be flexible. Additionally, the hook part 151G may be configured to latch onto the receiving part 152G so as to have a predetermined looseness with respect to the receiving part 152G. In these cases, the hook part 151G and the receiving part 152G are capable of connecting the plates 100G so as to be able to allow the difference between the heights of the support surfaces S1 when the heights of the support surfaces S1 are different between the adjacent plates 100G.

Although the plate system 10, etc., according to the present disclosure support the power transmission coil part 20 of the power transmitter 1 for charging a battery of the vehicle V, the plate system 10, etc., may support a power transmission coil part of a wireless power transfer system for charging a battery of a movable object other than a vehicle, such as an underwater vessel. Additionally, the plate system 10, etc., according to the present disclosure may support a power transmission coil part of a wireless power transfer system for charging a battery of objects other than movable objects, such as consumer electronics. Moreover, other than a power transmission coil part, the plate system 10, etc., may also support a power reception coil part. Furthermore, other than a coil part of a wireless power transfer system, the plate system 10, etc., may also support a coil part of an induction heating system or an eddy current flaw detection system. The plate system 10, etc., may also support an object to be supported other than a coil part.

INDUSTRIAL APPLICABILITY

The plate and the plate system according to the present disclosure are capable of supporting an object to be supported at a desired height position and in a desired tilt state.

REFERENCE SIGNS LIST 10, 10E-10G Plate system
20 Power transmission coil part (Object to be supported)
100, 100A Plate
110, 110A-110C, 110E-110G Plate part
111 Through hole
120, 120B-120D Adjustment part
121 Screw
121a Head portion
121b Distal portion
122 Support pad
150, 150F Connection part
151G Hook part (Connection part)
152G Receiving part (Connection part)
M1, M2 Groove
S1 Support surface
S2 Opposite surface
T1 Thread
R Road surface (Installation surface)
V Vehicle (Object to be supported)

The invention claimed is:

1. A plate system comprising:
a plurality of plates for supporting an object to be supported on an installation surface, the plurality of plates installed by being aligned on the installation surface,
wherein the plates include
a plate part having a support surface for supporting the object to be supported, and
an adjustment part attached to the plate part and capable of adjusting a height position of the support surface relative to the installation surface,
wherein the support surface includes a first groove and a second groove deeper than the first groove,
the adjustment part is capable of adjusting the height position of the support surface to a first height position and a second height position higher than the first height position,
the plurality of plates includes a first plate and a second plate adjacent one another,
the first plate has the first height position as the height position of the support surface,
the second plate has the second height position as the height position of the support surface, and
at least part of an end of the first groove of the first plate opposes at least part of an end of the second groove of the second plate in an aligning direction of the first plate and the second plate.

2. The plate system according to claim 1, wherein
the plate part includes a through hole passing therethrough from an opposite surface being a surface opposite the support surface, to the support surface, the through hole having a thread formed on an inner surface thereof,
the opposite surface faces the installation surface,
the adjustment part includes a screw engaging the thread formed in the through hole,
a head portion of the screw is positioned between the support surface and the opposite surface in the through hole, and
a distal portion of the screw protrudes from the opposite surface.

3. The plate system according to claim 2, wherein
the adjustment part further includes a support pad attached to the distal portion of the screw, to be brought into contact with the installation surface, and
the screw is rotatable and tiltable relative to the support pad.

4. The plate system according to claim 1, further comprising a connection part for connecting the plates adjacent to one another so as to be able to allow differences in height from the installation surface.

5. The plate system according to claim 1 wherein an edge portion of the plate part includes a notch part,
a width of the notch part at a position of the edge portion of the plate part is narrower than a width of the notch part at a position away from the edge portion, and
the connection part engages with the notch part to connect the plates adjacent to one another.

* * * * *